INVENTOR
ROBERT J. ALLEN
BY
Bower & Patalidis
ATTORNEYS

May 14, 1968 R. J. ALLEN 3,382,775
MACHINE FOR FABRICATING CONTAINERS
Filed Oct. 29, 1964 9 Sheets-Sheet 2

INVENTOR
ROBERT J. ALLEN
BY
Bower & Patalidis
ATTORNEYS

May 14, 1968 R. J. ALLEN 3,382,775
MACHINE FOR FABRICATING CONTAINERS
Filed Oct. 29, 1964 9 Sheets-Sheet 3

INVENTOR
ROBERT J. ALLEN
BY
Bower & Patalidis
ATTORNEYS

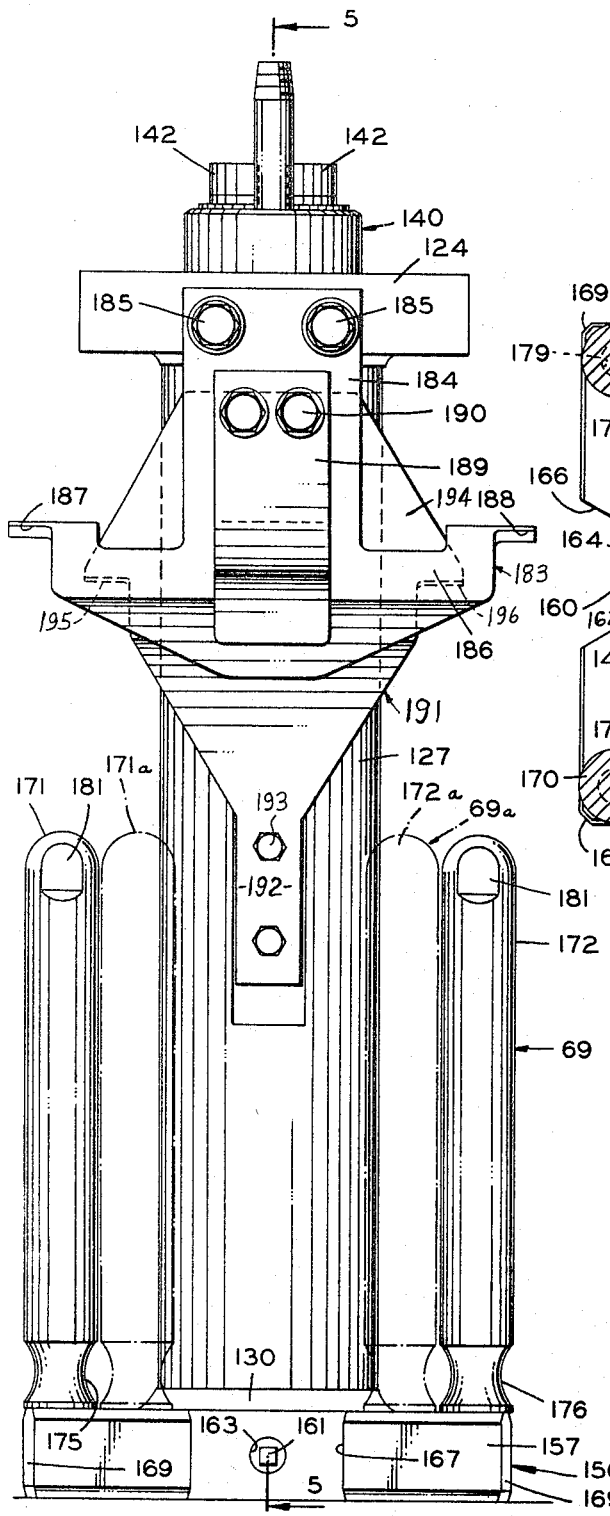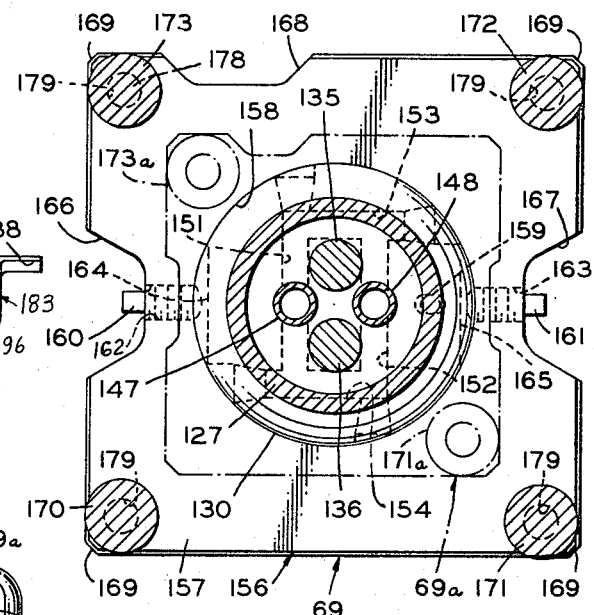

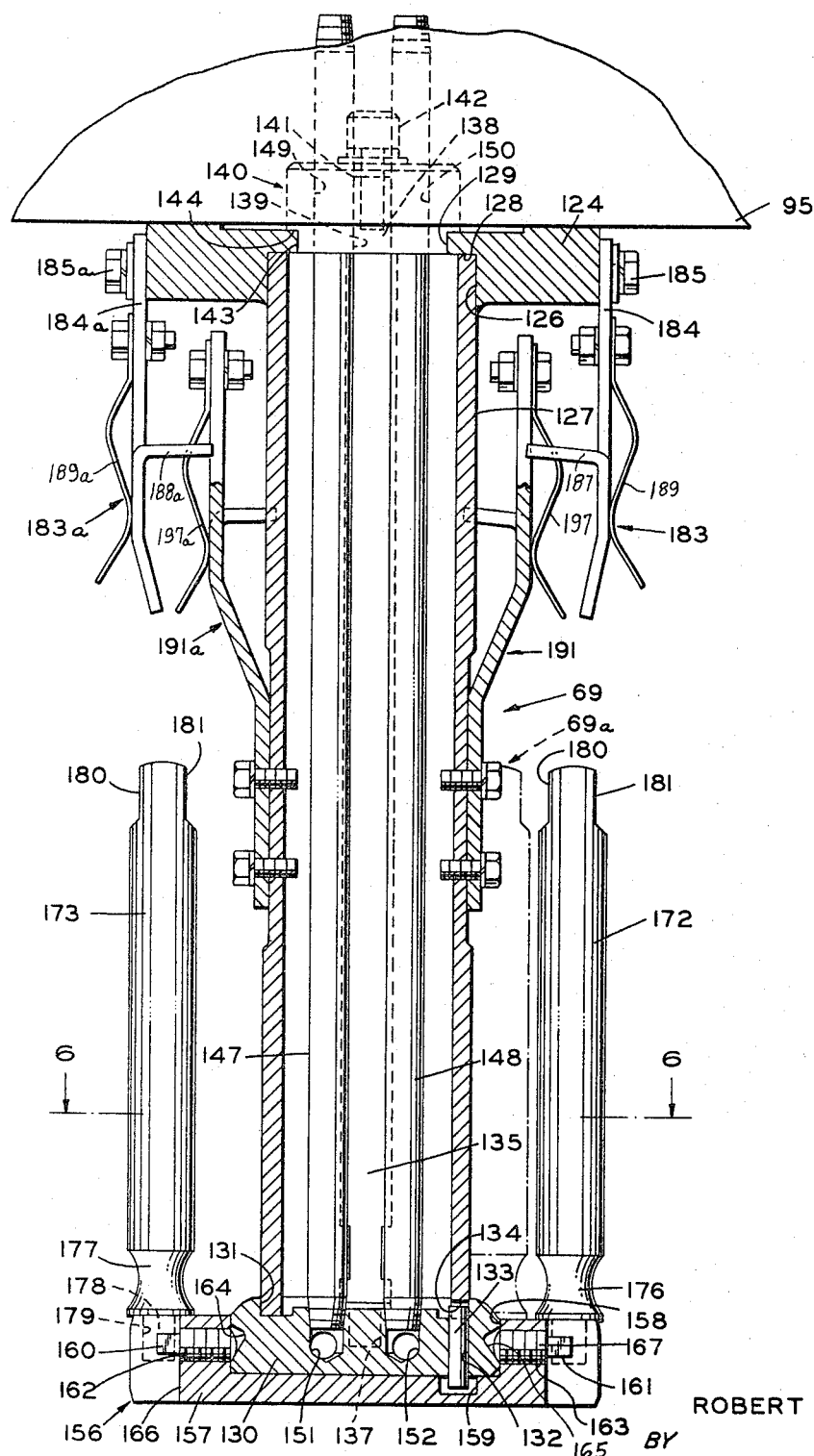

May 14, 1968 R. J. ALLEN 3,382,775
MACHINE FOR FABRICATING CONTAINERS
Filed Oct. 29, 1964 9 Sheets-Sheet 6

INVENTOR
ROBERT J. ALLEN
BY
Bower & Patalidis
ATTORNEYS

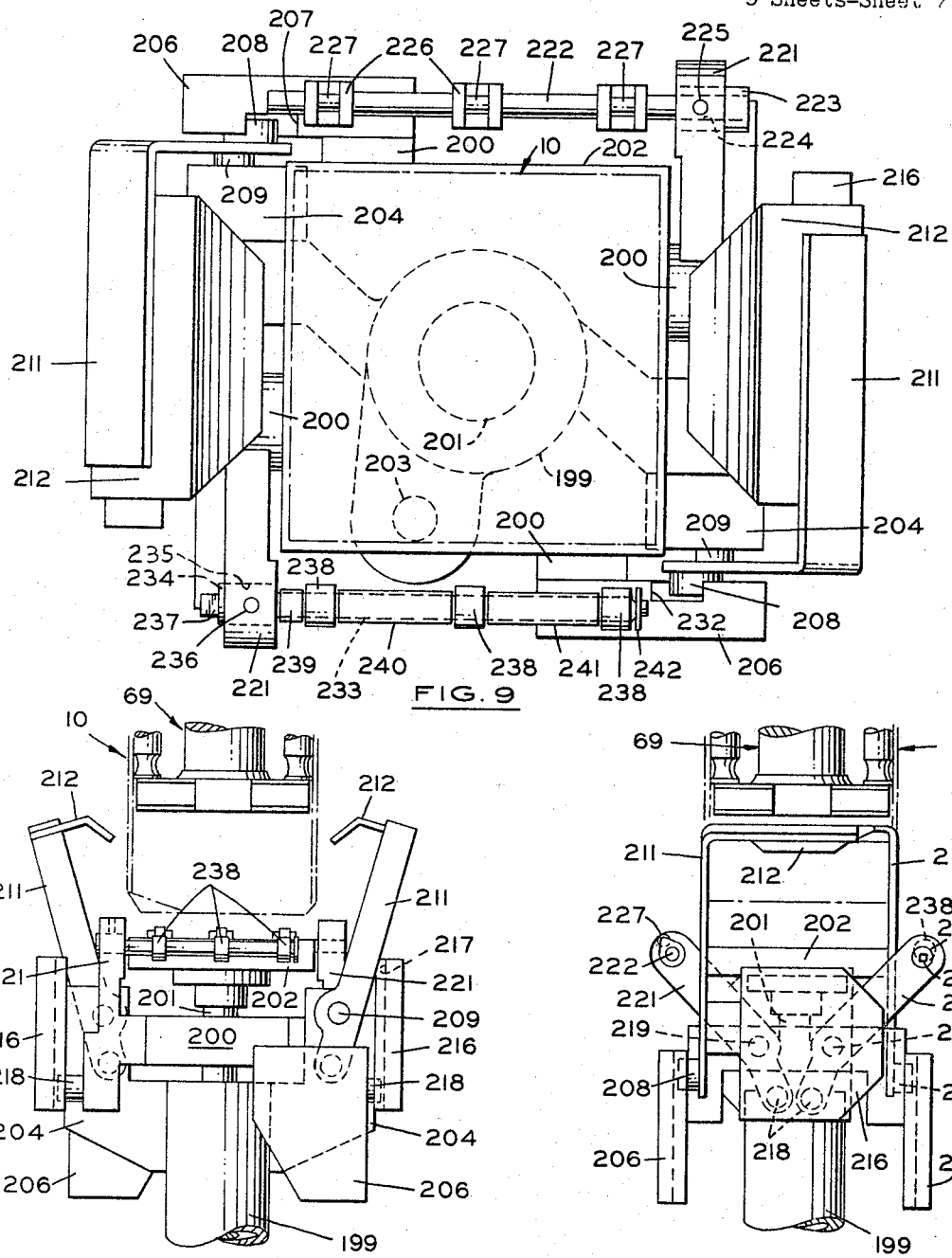

May 14, 1968  R. J. ALLEN  3,382,775
MACHINE FOR FABRICATING CONTAINERS
Filed Oct. 29, 1964  9 Sheets-Sheet 8

INVENTOR
ROBERT J. ALLEN
BY
Bower & Patalidis
ATTORNEYS

May 14, 1968

R. J. ALLEN 3,382,775

MACHINE FOR FABRICATING CONTAINERS

Filed Oct. 29, 1964

INVENTOR
ROBERT J. ALLEN
BY
Bower & Patalidis
ATTORNEYS

United States Patent Office 3,382,775
Patented May 14, 1968

3,382,775
MACHINE FOR FABRICATING CONTAINERS
Robert J. Allen, Farmington, Mich., assignor to
Ex-Cell-O Corporation
Filed Oct. 29, 1964, Ser. No. 407,369
6 Claims. (Cl. 93—44.1)

ABSTRACT OF THE DISCLOSURE

A container bottom closure folding apparatus having a pair of cooperating tucker rods with rollers adjustable mounted on each rod. The first rod having individually adjustable rollers for bowing the tuck-in flap panel and the second rod being eccentrically mounted allowing uniform rotatable adjustment of the rollers acting on the tuck-out flap panel.

---

This invention relates generally to packaging machines which fabricate and fill paperboard containers, and more particularly to a packaging machine provided with a novel and improved container mandrel and bottom closing assembly capable of fabricating paperboard containers of different sizes.

Various types of low rate production container packaging machines have recently become available which are smaller and less expensive than the prior art high rate production machines. These smaller and less expensive machines are, however, adapted to fabricate, fill and seal containers of only one size, as for example, a one gallon container. At the present time there is a need in the market for a small inexpensive machine which may be used for filling different sized containers. Accordingly, it is an important object of the present invention to provide a novel and improved container packaging machine which can be used to fabricate more than one size container, which is capable of filling and sealing the container, and which may be controlled by one operator.

It is an object of this invention to provide a novel and improved paperboard container packaging machine which is adapted to fabricate various sized containers, in an upright position, and maintain the containers in the upright position throughout the subsequent filling and top sealing operations on the containers.

It is another object of the present invention to provide a novel and improved paperboard container fabricating machine which is provided with a novel container mandrel assembly for forming the bottom of the containers, and which is adapted to utilize the natural spring in the container blanks to retain the container blanks squarely on the mandrel assembly during a bottom forming operation to provide a well constructed, high quality container bottom.

It is still another object of the present invention to provide a paperboard container packaging machine which is provided with a novel bottom forming mandrel assembly that includes a plurality of elongated fingers which engage at least two of the inside corners of a flat container blank when it is expanded and which elongated fingers retain the blank on the mandrel assembly in a squared condition by coacting with the natural spring tendency or characteristic of the blank to return to the flat collapsed condition.

It is a further object of the present invention to provide a novel and improved container bottom forming mandrel assembly for a coated paperboard container fabricating machine which is capable of being quickly and efficiently converted from a first container size to a second container size.

It is still a further object of the present invention to provide a novel and improved container bottom forming apparatus for a container packaging machine which includes a novel roller mechanism for closing the container bottom closure panels and sealing the same in place.

It is another object of the present invention to provide a novel and improved container bottom folding, tucking and bonding apparatus, for a container packaging machine, which includes a first roller means for moving the tuck-in flap on one bottom closure panel into a bottom closing and bonding position, and a second roller means which is eccentrically mounted and adapted to move the tuck-out flap on another bottom closure panel into the bottom closing and bonding position; and wherein said second roller means is adjustable on its eccentric mounting to permit efficient bottom closing of various sized containers.

It is still another object of the present invention to provide a paperboard container fabricating machine having parts which can be quickly repositioned to permit containers of more than one size to be fabricated, and which is simple and compact in construction, and efficient and reliable in operation.

Other objects, features and advantages of this invention will be apparent from the following detailed description, appended claims, and the accompanying drawings.

In the drawings:

FIG. 4 is an elevational view of a container mandrel for use in the fabrication of a gallon container, and showing in broken lines the comparative configuration of a container mandrel for use in the fabrication of a half-gallon container;

FIG. 5 is an elevational sectional view of the structure illustrated in FIG. 4, taken along the line 5—5 thereof, and looking in the direction of the arrows;

FIG. 6 is a horizontal sectional view of the structure illustrated in FIG. 5, taken along the line 6—6 thereof, and looking in the direction of the arrows;

FIG. 9 is a top plan view of the bottom folding, tucking and bonding unit;

FIGS. 10, 11, 12, 13, 14 and 15 are fragmentary elevational views of the structure illustrated in FIG. 7, and showing the sequence of events for the bottom folding, tucking and bonding operations;

The container fabricating machine of the present invention is particularly adapted to fabricate, fill and seal cartons or containers of the type shown in the U.S. Patents No. 3,120,335, issued Feb. 4, 1964; 3,120,333, issued Feb. 4, 1964; 3,185,375, issued May 25, 1965; and 3,270,940, issued Sept. 6, 1966. These patents are assigned to the assignee of the subject application, and the disclosures thereof are incorporated herein by reference. For a more complete description of a container which may be fabricated by the machine of the present invention, reference should be made to the aforementioned patents. It will be understood that the machine of the present invention may also be utilized in producing containers from flat collapsed blanks other than those particularly shown in said patents. The container described in this application is made from paperboard having a polyethylene coating thereon, but it should be understood that other suitable thermoplastic coatings may be employed as a coating for the container.

The novel and improved mandrel assembly, and bottom forming and closing structure of the present invention, have been shown herein as applied to an illustrative packaging machine which is described in detail in the U.S. Patent 3,212,413, issued Oct. 19, 1965, and which is assigned to the assignee of the subject invention. Reference should be made to the last mentioned patent for a more complete description of the packaging machine, and the disclosure of said last mentioned patent is incorporated herein by reference. It should be understood that there is no intention to limit the invention to use with the specific machine form disclosed, and that the intention is to cover all modifications, equivalents, alternative constructions and uses falling within the spirit and scope of the invention as expressed in the appended claims.

*Container general description*

Figure 16:
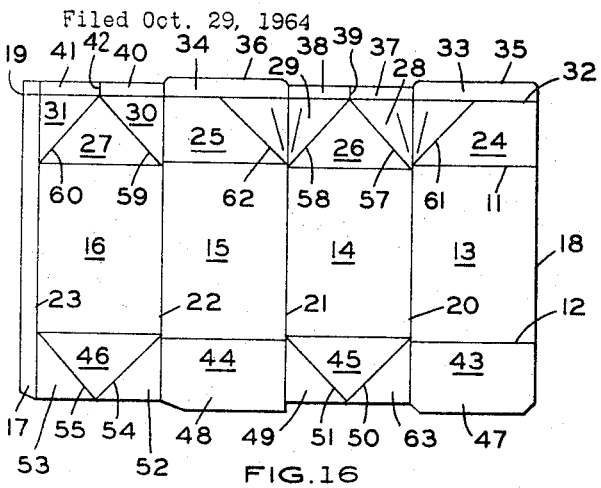
FIG. 16 is a layout view of a blank from which the containers are erected, showing the inside surface thereof.
Figure 21:
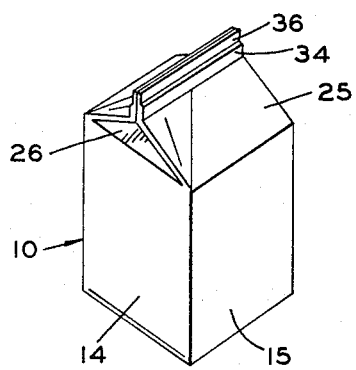

Before proceeding with the description of the container fabricating machine of the present invention, an illustrative container of the type fabricated by the machine will be generally described. Referring to FIG. 21, the numeral 10 generally designates a gable top, infold, bottom coated paperboard container or carton of one type adapted to be fabricated by the machine of the present invention. FIG. 16 shows the container 10 in flat blank form, with the inside surface of the blank showing, and having formed thereon the appropriate score or fold lines. The container 10 is separated into three vertically disposed groups of panels by the score lines 11 and 12.

The material above the score line 11 is termed the top closure, the material between the score lines 11 and 12 is termed the body panel group, and the material below the score line 12 is termed the body closure panel group. The body panel group comprises the four panels indicated by the numerals 13, 14, 15 and 16, and the side seam flap 17. The container flat blank is defined on the sides by edges 18 and 19. The panels 13 through 16 are separated by the score lines 20 through 23.

The top closure contains the roof panels 24 and 25 and the end panels 26 and 27. The end panel 26 is connected to the roof panels 24 and 25 by the fold-back panels 28 and 29, respectively. The end panel 27 is connected to the roof panel 25 and the side seam flap 17 by the fold-back panels 30 and 31, respectively. Score line 32 indicates the top extension of panels 24 through 27.

As shown in FIG. 16, a pair of outer rib panels 33 and 34 are attached to the roof panels 24 and 25, respectively along the score line 32. The roof panels 33 and 34 are provided with the sealing flaps 35 and 36 at their upper ends, respectively. Secured to the end panel 26 by the fold-back panels 28 and 29, at the score line 32, are the inner rib panels 37 and 38, respectively. The fold-back panels 28 and 29 are connected to the end panel 26 at the score lines 57 and 58, respectively. The inner rib panels 37 and 38 are connected at the score line 39. Attached to the end panel 27 by the fold-back panels 30 and 31 are the inner rib panels 40 and 41, respectively, along the score line 32. The fold-back panels 30 and 31 are connected to the end panel 27 at the score lines 59 and 60, respectively. The inner rib panels 40 and 41 are connected at the score line 42.

The bottom closure panel group is made up of the panels 43 through 46. The bottom closure panels 43 and 44 are substantially square in plan configuration. The bottom closure panels 45 and 46 are substantially triangular in plan configuration. The bottom closure panel 43 has an extended tuck-in flap 47, and the bottom closure panel 44 has an extended tuck-out flap 48. The bottom closure panel 45 is connected to the adjacently disposed triangular fold-back panels 49 and 63 at the score lines 50 and 51, respectively. The bottom closure panel 46 is connected to the adjacently disposed triangular fold-back panels 52 and 53 at the score lines 54 and 55.

Figure 17:
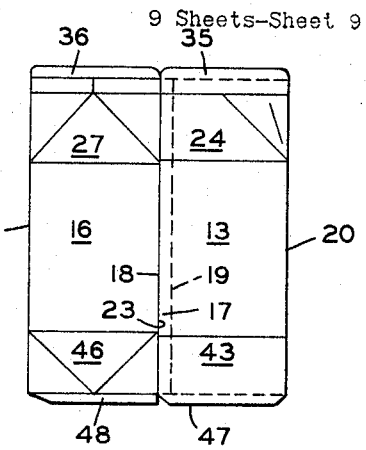
FIG. 17 is a flat side seam blank made from the blank shown in FIG. 16, and showing the outside surface thereof.
Figure 18:
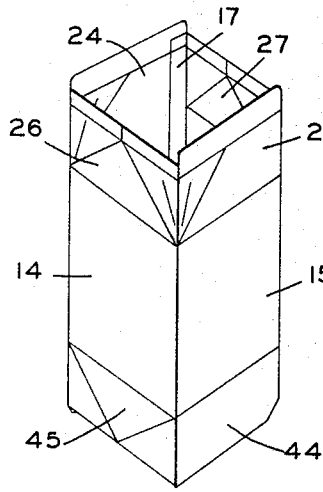
FIG. 18 is a perspective view of the container, showing it in tubular form as it appears when mounted on a mandrel.

The paperboard blank shown in FIG. 16 is folded in the following described manner in order to form a flat side seamed container blank for presentation to the hereinafter described packaging machine. To form the flat side seam blank, panel 16 and side seam flap 17 are folded about score line 22 until their inside surfaces meet the inside surfaces of panels 15 and 14, respectively. Panel 13 is then folded about score line 20 until its inside surface contacts the inside surface of panel 14 and the outside surface of flap 17. The inside surface of panel 13 along edge 18 meets the outside surface of side seam flap 17 and is heated to activate its coating. The outside surface of side seam flap 17 is also heated to activate its coating so that as the last two mentioned surfaces meet they are bonded together. Pressure is then applied to secure the bond between these two surfaces. The edge 18 of panel 13 and the score line 23 between panels 16 and 17 then appear as one line in the flat blank container which is presented to the packaging machine. The flat blank container looks like the flat side seam container shown in FIG. 17 after it is side seamed. It is then ready to be supplied to the hereinafter described packaging machine. When the flat blank container of FIG. 17 is loaded onto the fabricating mandrel of the packaging machine it takes the tubular shape illustrated in FIG. 18.

The container bottom is formed by moving the bottom closure panels in the following described manner. The panels 43 and 44 are moved toward each other. The panels 45 and 46 are also moved toward each other. This action causes the fold-back panel 52 to rotate about score line 22 so that the inside surface of panels 53 and 44 move in a direction to come together. At the same time, panel 52 rotates about the score line 54. Thus the outside surfaces of panels 52 and 46 come together. Fold-back panels 49, 63 and 53 makes the same movements as panel 52 with panels 43-45, 45-46 and 43-46, respectively. The bottom closure panel 43 moves toward bottom closure panel 44 at a rate faster than panel 44 moves toward panel 43, so that the tuck-in flap 47 is positioned between the fold-back panels 49-52 and panels 44-48.

Figure 19:
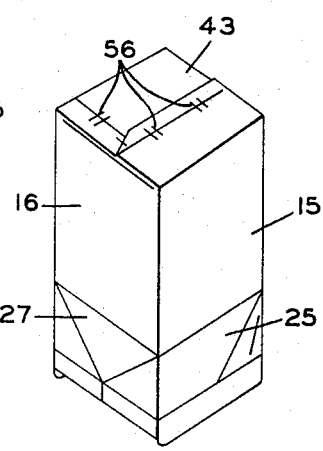
FIG. 19 is a perspective view of the container bottom closure, in tubular form, and as it appears after bottom forming, with the container turned upside down to show its bottom end.
Figure 20:
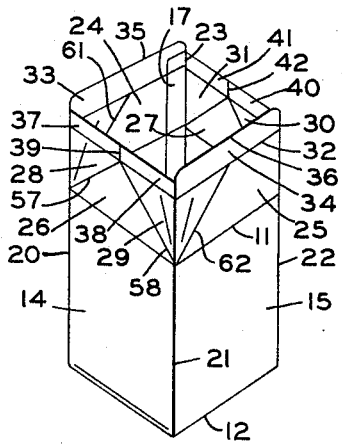
FIG. 20 is a perspective view showing the container as it appears when it is stripped from the bottom closure mandrel assembly and conveyed onto the transfer mechanism of the machine of FIG. 1; and, FIG. 21 is a perspective view of the container after it has been formed, filled, closed, sealed, and discharged from the machine of FIG. 1 as a completed container.

As shown in FIG. 19, the container is provided with embossing marks 56 which are impressed on the bottom of the container at critical locations to prevent any possibility of liquid leakage through the formed bottom of the container 10. After the bottom closure is completely formed, it appears as shown in FIG. 19. When the container 10 is transferred from the bottom closing mandrel assembly to the top closing assembly, it will appear as shown in FIG. 20.

The top of the conainer is formed in the following described manner. The end panels 26 and 27 rotate about score line 11 and move toward each other. This action causes the roof panels 24 and 25 to move towards each other, rotating about score line 11. The fold-back panel 29 rotates about score line 21 causing its inside surface to move toward the inside surface of roof panel 25. At the same time, panel 29 rotates about score line 58 causing its outside surface to move toward the end panel 26. Panel 29 also has a slight rotation about score line 32 with respect to inner rib panel 38, permitting panel 38 to remain in a vertical up and down position. Fold-back panels 28, 30 and 31 make the same movements as panel 29 with panels 24–26–37, 25–27–40 and 24–27–41, respectively. Score lines 39 and 42 meet at the middle of the container 10. The sealing flaps 35 and 36 meet at the top of the container and extend from the middle of panel 14 to the middle of panel 16.

*General machine description*

Figure 1:
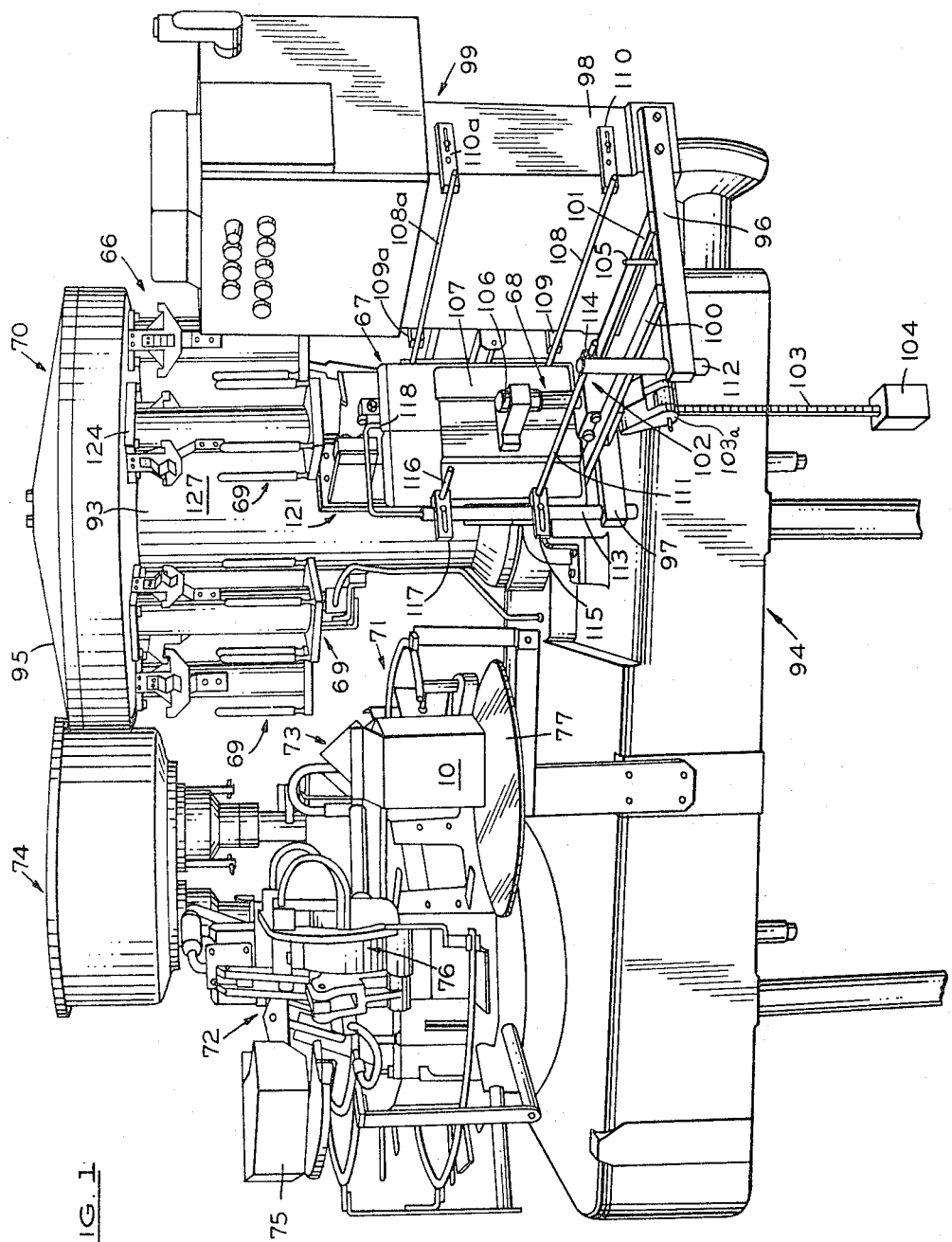
FIG. 1 is a perspective view of a container packaging machine made in accordance with the principles of the present invention.

Referring now to FIG. 1, the numeral 66 generally indicates an illustrative packaging machine adapted to receive a supply 67 of side seam container blanks, similar to the blank shown in FIG. 17. Individual container blanks 10 are removed from the supply 67 by the loader mechanism 68 and positioned on individual mandrels 69 which are operatively mounted on the bottom closing mandrel assembly generally indicated by the numeral 70. In operation, the mandrel assembly 70 rotates and moves the mandrels 69 from lift to right, as viewed in FIG. 1. A container 10 mounted on a mandrel 69 is thus moved through a series of work stations where various operations are performed on the container, such as folding, tucking and bonding of the bottom closure panels.

As shown in FIG. 1, the numeral 71 generally indicates a transfer station which is adapted to receive bottom formed containers 10 from the mandrels 69 for subsequent filling and top closing assembly operations. The top closing assembly portion of the machine is generally indicated by the numeral 72, and it rotates in the same direction as the bottom closing mandrel assembly 70. After the bottom formed container 10 has been transferred to the top closing assembly 72, the top closure panels thereof are pre-broken by the top pre-breaker 73. The top closing assembly 72 then indexes a bottom formed container 10 to the filler unit, generally indicated by the numeral 74, where the container is filled. The top closing assembly 72 then rotates the container under the top heating unit 75 where the inner and outer rib panels are appropriately heated. The container is then moved to the top closing unit 76 where the container top is sealed. The filled and sealed container 10 is then discharged from the machine onto the discharge table 77 and is ready for delivery to the customer in the completed form shown in FIG. 21.

Figure 2:
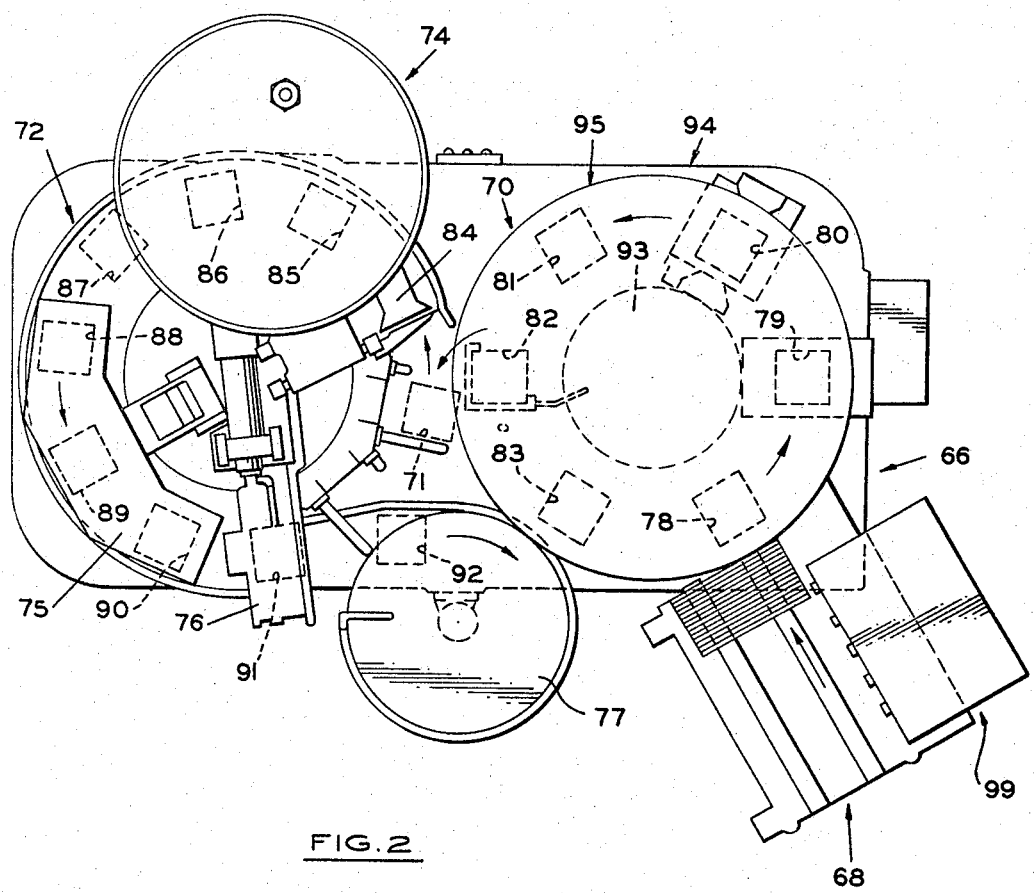
FIG. 2 is a schematic top plan view of the machine illustrated in FIG. 1, and showing the relative positions of the various parts thereof.

As viewed in FIGS. 1 and 2, a container blank 10 is taken from the side seamed blank supply 67 by the loader mechanism 68 and transferred to the mandrel 69 positioned at the loading station 78. As viewed in FIG. 2, mandrel assembly 70 then indexes the mandrel 69 in a counter-clockwise direction from loading station 78 to the bottom heat station 79. On the second index the container 10 is rotated to the bottom folding, tucking and bonding station 80. The third index moves the container 10 to the dwell station 81. The fourth index moves the container 10 to the mandrel ejection station 82 where the container is stripped from the mandrel 69 down to the transfer station 71. The container 10 is thus transferred to the rotary indexing top closing assembly 72 at the receiving or transfer station 71. The mandrel 69 which has just had its container 10 stripped from it is then indexed a fifth time to the dwell station 83. During the fifth index, the container 10 transferred to station 71 is indexed to the top pre-breaker station 84. On the sixth index the mandrel 69 on the mandrel assembly 70 will again be at the load station 78 to receive another container 10 and start the next cycle. Also, on the sixth index the container 10 at the station 84 of the top closing assembly 72 will index to station 85 where the container is partially filled with liquid. The partially filled container is then given a seventh index to station 86 where the liquid filling operation is completed by the filler unit 74. The use of one or both of the fill stations 85 and 86 depends upon the volume of liquid to be filled.

The top closing assembly 72 next rotates to dwell station 87. The top closing assembly 72 continues to index, rotating through stations 88, 89, and 90 which are heat stations where the top panels are heated so that the container 10 can be sealed together when it reaches the sealing station 91. As the top closing assembly 72 continues to rotate, the container 10 will be discharged onto the disc discharge table 77 at the discharge station 92. The top closing assembly 72 will then rotate to the transfer or receiving station 71 to receive another container 10 from the bottom closing mandrel assembly 70.

The bottom closing mandrel assembly 70 and the top closing assembly 72 may be rotated in the aforedescribed manner by any suitable power system. The power system shown and described in the last mentioned U.S. Patent 3,212,413, issued Oct. 19, 1965, shows a suitable power drive system, and the disclosure of said last mentioned patent is incorporated herein by reference. The power drive system of the machine would be operatively connected to the rotatable mandrel support 95 for rotating the same through the aforedescribed bottom closing operations. The mandrel support 95 is rotatably mounted by suitable means in the vertical mandrel assembly support housing 93 which is mounted on the machine base 94.

*Load mechanism*

Referring generally to FIGS. 1 and 2, it will be seen that the load mechanism 68 is disposed adjacent the rotary travel path of the bottom closing mandrel assembly 70, and at a point adjacent the loading station 78. The supply 67 of side seamed container blanks is placed upon a pair of track members 100 and 101 in a manner so that the supply may be fed onto the mandrel assembly 70. The track members 100 and 101 are supported by the spaced aparthorizontal support members 96 and 97 which are fixed at one end thereof to the vertical support member 98, on the upper end of which is secured the operator control box 99.

The load mechanism 68 further includes a pusher means, generally indicated by the numeral 102, and which is rollably mounted on the tracks 100 and 101. The pusher means 102 is adapted to be normally biased or moved toward the bottom closing mandrel assembly 70 by the weight 104, which is mounted on one end of the chain 103. The chain 103 is operatively mounted around the chain roller 103a, and has the other end thereof connected to the pusher means 102. The chain roller 103a is fixed to the support member 97. The weight 104 tends to move the pusher means 102 forward, towards the mandrel support housing 93. The pusher means 102 carries the vertically disposed shaft 106 which is adapted to swively support the tension plate member 107. The pusher means 102 is adapted to be releasably held in the rearward or inoperative position by being detachably engaged with the lock pin 105 in any suitable manner. The lock pin 105 is secured to the support member 96.

The pusher means 102 would be releasably connected to the lock pin 105 when there are no blanks on the tracks 100 and 101, or a new supply of blanks is being mounted on these tracks. It will be seen that when the pusher means 102 is detachably secured in the rearward position to the pin 105, a new supply of blanks 10 may be placed ahead of the tension plate member 107, and that when the pusher means 102 is released from the lock pin 105, the tension plate 107 will be moved forwardly to continually urge the container blank supply 67 forward toward the mandrel assembly support housing 93. The aforedescribed load mechanism structure is shown in detail in the last mentioned co-pending U.S. patent and the load mechanism disclosure therein is incorporated herein by reference.

The load mechanism 68 is provided with a blank guide means which comprises a plurality of sidewardly adjustable guide rods. As shown in FIG. 1, a guide rod 108 is disposed along one side of the track 101 and has the ends thereof connected to the adjustable mounting brackets 109 and 110. The brackets 109 and 110 are adjustably mounted on the ends of the vertical support member 98. A similar guide rod 108a is disposed above the guide rod 108 and is similarly supported on the vertical support member 98 by the adjustable mounting brackets 109a and 110a. It will be seen that the guide rods 108 and 108a are longitudinally disposed relative to the track 101 and they are spaced outwardly therefrom and in vertical alignment with each other. The load mechanism further includes the longitudinally disposed guide rod 111 which is disposed outwardly from the other tracks 100, and which is adjustably mounted on the vertically disposed support rods 112 and 113 by means of the brackets 114 and 115. The support rods 112 and 113 are suitably connected to the outer ends of the support beams 96 and 97, respectively. The adjustable brackets 114 and 115 are suitably connected to the support rods 112 and 113 by any suitable adjustable means. An adjustable bracket 117 is adjustably mounted on the upper end of the support rod 113 in a position above the bracket 115. The bracket 117 supports a longitudinally disposed guide rod 116 which is parallel with the guide rod 111 and in a position vertically spaced apart. The support rod 113 carries on the upper end thereof the retainer arm 118 which is vertically disposed over the inner ends of the tracks 100 and 101 and in a position to engage the upper end of the container in the container supply 67. The retainer arm 118 co-acts with the suction blank feed means generally indicated by the numeral 121 for feeding the container blanks onto the mandrel 69 in the same manner as disclosed in the last mentioned co-pending patent. The suction feed means 121 is disclosed in detail in said last mentioned co-pending patent and the disclosure of the same is incorporated herein by reference.

When the supply of blanks is placed upon the track members 100 and 101, the containers 10 will be so oriented that the top panels are up and the bottom panels are down. Score line 20 will be held by the guide rod 111 and score line 22 will be acting on the guide rod 108 held by the guide rod supports 109 and 110. Side panels 13 and 16 will be disposed towards the mandrel support housing 93 and the side panels 14 and 15 will be disposed toward and acted upon by the tension plate member 107.

As shown in FIG. 1, the retainer arm 118 acts on the sealing flap 36. The retainer arm 172 functions to start the side panel 13 rotating about the score line 20 to move it away from the side panel 14 during the initial loading operation of a container upon the mandrel 69 disposed at the loading station 78. As the loading operation continues, the container is moved into a diamond shape and as the loading action continues, the cross section of the container turns into a square cross section. It should be noted that the container has a tendency to want to lie flat, so as to have the score lines 23 and 21 in contact with each other. The loading mechanism thus works against the natural tendencies of the container blank to remain flat. When a container 10 is moved into a position under the mandrel 69 disposed at the loading station 78, the container is moved upwardly and into a position mounted on the mandrel 69 by a suitable load cylinder of the type shown and described in the last mentioned co-pending patent, and the disclosure of the same is incorporated herein by reference.

Mandrel assembly

Figure 3:
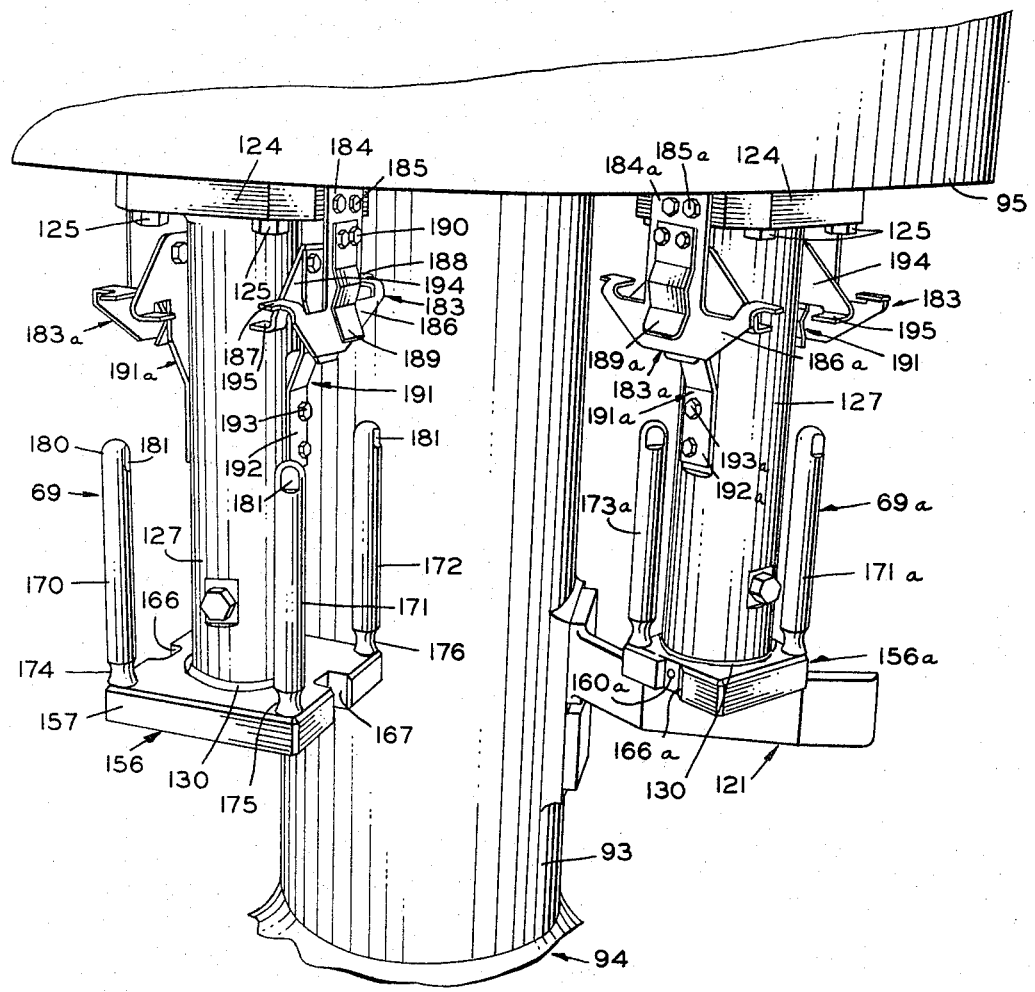
FIG. 3 is a fragmentary, elevational perspective view of the mandrel support housing of the machine illustrated in FIGS. 1 and 2, and showing a pair of novel container mandrels made in accordance with the principles of the present invention.

FIGS. 3, 4, 5 and 6 illustrate a novel mandrel made in accordance with the invention. In FIG. 3 the numeral 69 generally designates a gallon size mandrel, and the numeral 69a generally indicates a half-gallon size mandrel. As shown in FIG. 3, the mandrel 69 includes the mandrel mounting plate 124 which is adapted to be secured to the lower side of the mandrel support 95 by any suitable means, as by a plurality of screws 125. The plate 124 is provided with the inwardly extended bore or recess 26 on the lower side thereof in which is seated the upper end of the mandrel post or cylinder 127. The inner end of the bore 126 terminates at the shoulder 128 which extends radially inwardly to the bore 129. It will be seen that the bores 126 and 129 provide a stepped hole through the plate 124.

As shown in FIGS. 5 and 6, the lower end of the mandrel post 127 is enclosed by the plug 130 which is provided on the upper side thereof with the annular recess 131. The lower end of the mandrel post 127 is seated in the annular recess 131. As shown in FIG. 5, the plug 130 is retained against rotation relative to the post 127 by means of the locating pin 133 which is mounted in the axial bore 132 in the plug 130. The locating pin 133 extends upwardly into the locating axial slot 134 formed in the lower end of the post 127.

The mandrel post 127 and the plug 130 are retained on the plate 124 by the following described structure. As shown in FIG. 6, a pair of longitudinally disposed retainer bars 135 and 136 are mounted within the post 127 and have the lower ends thereof threadably mounted in suitable holes, as 137, in the plug 130. As illustrated in FIG. 5, the upper ends of each of the bars 135 and 136 extend through the bores 126 and 129 in the plate 124. The upper ends of these bars are indicated by the numeral 138 in FIG. 5, and they are received in axial holes as 139 in the plug 140. The plug 140 has a reduced lower end portion 143 which is seated in the plate bore 129. The numeral 141 indicates the upper edge of the retainer bars 135 and 136. A pair of retainer screws 142 are threadably mounted into the upper ends of the retainer bars 135 and 136 and coact with the upper end plug 140 to draw the plug 130 upwardly to secure the post 127 in the recess 126. The shoulder 144 on the plug 140 seats on the upper side of the plate 124. As shown in FIGS. 5 and 6, the mandrel is provided with a pair of longitudinally extended warm air tubes 147 and 148 which are disposed within the post 127. The lower ends of the tubes 147 and 148 are threadably mounted in holes which communicate with the spaced apart horizontal bores 151 and 152. The upper ends of the tubes 147 and 148 extend through suitable holes as 149 and 150, respectively, in the plug 140. The tubes 147 and 148 are adapted to be connected at their upper ends to a suitable source of warc air for helping to heat up the thermoplastic on the bottom panels during a bottom forming operation. As shown in FIG. 6, the bores 151 and 152 are connected at the ends thereof by the transverse bores 153 and 154. The bores 151 through 154 form a passage through the plug 130 for the passage of warm air.

The numeral 156 generally indicates the mandrel cap in FIGS. 3 through 6. As best seen in FIG. 6, the mandrel cap 156 includes the square plate 157 which is provided on the upper end thereof with the annular recess 158. A locating hole 159 is formed in the lower surface of the plate wall facing the recess 158, and receives the lower end of the locating pin 133. The plate 157 is adapted to be releasably mounted on the plug 130. The plug 130 is adapted to be slidably mounted in the annular recess 158 and to be releasably secured to the plate 157 by the retainer screws 160 and 161. As shown in FIGS. 5 and 6, the screws 160 and 161 are threadably mounted in the horizontal holes 162 and 163, and these holes are disposed diametrically opposite to each other and in alignment with each other. The inner ends of the retainer screws 160 and 161 are adapted to be seated in the horizontal retainer slots 164 and 165, respectively. It will be seen that the plate 157 may be quickly released from the plug 130 by threading the screws 160 and 161 outwardly and out of the slots 164 and 165.

As best seen in FIG. 6, the plate 157 is provided with the recesses 166, 167 and 168 on three sides thereof. The screws 160 and 161 are mounted on the inner ends of the recesses 166 and 167. The recesses 166, 167 and 168 function to prevent cavitation during the discharge operation wherein the container, after the bottom is formed thereon, is stripped from the mandrel at the transfer station 71. The plate 157 is provided with the vertical chamfer 169 on each of the vertical corners thereof. As best seen in FIGS. 4, 5 and 6, the mandrel cap 156 is provided with an upwardly extended guide finger or guide rod at each corner of the plate 157, and these guide fingers are designated by the numerals 170, 171, 172, and 173. FIG. 6 shows that these guide fingers are disposed so that the peripheries thereof are tangent with the adjacent two sides of the plate 157 at their respective corner locations. Each of these guide fingers are provided with undercut, concave inwardly extended peripheral surfaces as indicated by the numerals 174 through 177. As shown in FIG. 5, the lower end of the guide finger 173 is provided with the reduced lower end portion 178 which is threadably mounted in the hole 179 formed on the upper side of the plate 157. Each of the other guide fingers are similarly secured to the plate 157. As shown in FIGS. 3, 4, and 5, the upper ends of each of the guide fingers are provided with a pair of parallel spaced apart flat surfaces 180 and 181 for engagement with a suitable tool for threading the guide fingers into position in the holes 179.

The mandrel cap 156 is adapted to receive and support a gallon container. As shown in FIG. 3, a mandrel cap 156a has been mounted on the past 127 for supporting a half-gallon container during a bottom forming operation. It will be seen that the mandrel caps may be quickly changed in an easy manner. FIG. 3 indicates a condition wherein the machine is being changed over from one size container cap to another, and one of the gallon mandrels 156 must still be changed over to a half-gallon mandrel 156a. The half-gallon mandrel 156a has been superimposed on the gallon mandrel in FIGS. 4, 5 and 6 to show the relative location and size of the mandrel caps 156 and 156a. It will be seen that the mandrel cap 156a is constructed in the same manner as the mandrel cap 156. It will be seen that the mandrel cap 156a for the half-gallon container employs only two guide fingers or guide rods. This is possible because of the smaller size of the half-gallon container. It will be seen that both mandrel caps 156 and 156a function to retain the containers on the mandrel by utilizing the natural spring in the container blanks to retain the container blanks squarely on the mandrel during a bottom forming operation. The guide fingers or rods engage the inner surfaces of adjacent container corners, and the natural spring in the container blanks urges the panels of the containers into gripping engagement with the guide fingers. The reduced portions, as 174 through 177, on the guide fingers function as cam surfaces during the upward movement of the containers over the mandrels.

As shown in FIGS. 4 and 5, the mandrels 69 are provided with a first pair of combination clip and stop structures indicated by the numerals 183 and 183a. The clip and stop structures 183 and 183a function with the gallon containers, and a similar pair of clip and stop structures 191 and 191a function with the half-gallon containers, as more fully described hereinafter.

As shown in FIG. 5, the clip and stop structure 183 is disposed diametrically opposite to the clip and stop structure 183a. The clip and stop structure 183 includes the vertically disposed plate 184 which is secured to one side of the mandrel plate 124 by a plurality of screws 185. The plate 184 extends downwardly and terminates in a sidewardly extended portion 186 on each side thereof. As shown in FIG. 4, the sidewardly extended portions 186 terminate in horizontally extended stop wings or members 187 and 188. Operatively mounted on the outer face of the plate 184 is a clip 189 which is secured to the plate 184 by a plurality of screws 190. It will be seen that the clip 189 is adapted to pass over the upper edge of a gallon container when the same is mounted on the mandrel 69. The stop members 187 and 188 will engage the upper edges two oppositely disposed side panels in a gallon container and limit the upward movement of the container on the mandrel 69. The clip and stop structure 183 has been marked with the same reference numerals followed by the small letter a.

As shown in FIGS. 3, 4 and 5, the half-gallon clip and stop structures 191 and 191a are disposed on opposite sides of the mandrel post 127 and in positions inwardly from the corresponding gallon structures 183 and 183a. It will be seen that these clip and stop structures remain on the mandrel post 127 regardless of whether gallon or half-gallon containers are being processed. It is only necessary to change the mandrel caps 156 and 156a when it is desired to change the machine over from one gallon size containers to half-gallon size containers or vice versa.

As shown in FIGS. 3, 4 and 5, the half-gallon clip and stop structure 191 includes a vertical plate 192 which is secured to the mandrel post 127 by a plurality of screws 193. The plate 192 is provided with the upwardly extended and sidewardly enlarged portion 194 which is provided on the outer sides thereof with the horizontal downwardly facing wings or stops 195 and 196. A clip 197 is operatively mounted on the outer side of the plate 192 by means of suitable screws 198. The clip and stop structure 180 is similarly constructed and is marked with the same reference numerals followed by the small letter a. FIG. 5 shows that the clips in each of the aforedescribed clip and stop structures are disposed so as to be in alignment with the outer surfaces of the guide pins in the respective sides of the corresponding mandrel caps. It will be understood that the guide fingers 170 through 173 may be formed with a cross section other than round, as for example, they may have a square cross section. In FIG. 3 the various parts of the mandrel caps 69a have been marked with the same reference numerals used on the mandrel cap 156 for the similar parts.

It will be understood that after a container has been mounted on a mandrel at the load station 78, the mandrel will be rotated to the heating station 79 where it will be heated by a suitable means, as for example, the container bottom heating means shown in the last mentioned copending patent. The container bottom heating means of said last mentioned patent is incorporated herein by reference. The container bottom surfaces are heated by the bottom heating means until the thermoplastic surface becomes activated so that bonding may occur at the next index station 80.

*Folding, tucking and bonding station*

The container 10 indexes from the bottom heat station 79 to the folding, tucking and bonding station 80 wherein the bottom forming operation is completed by the novel structure shown in FIGS. 7 through 15.

The folding, tucking and bonding station structure includes the pressure pad support member 199 which is secured to the machine base 94. A shaft 201 is reciprocally mounted in the member 199. A pressure pad 202 is secured to one end of the shaft 201. A support plate 200 is secured to shaft 201 at a point below pad 202. A guide shaft 203 is secured to the support plate 200 and prevents mis-alignment of the shaft 201 and its associated part as they reciprocate up and down. As shown in FIG.

Figure 7:
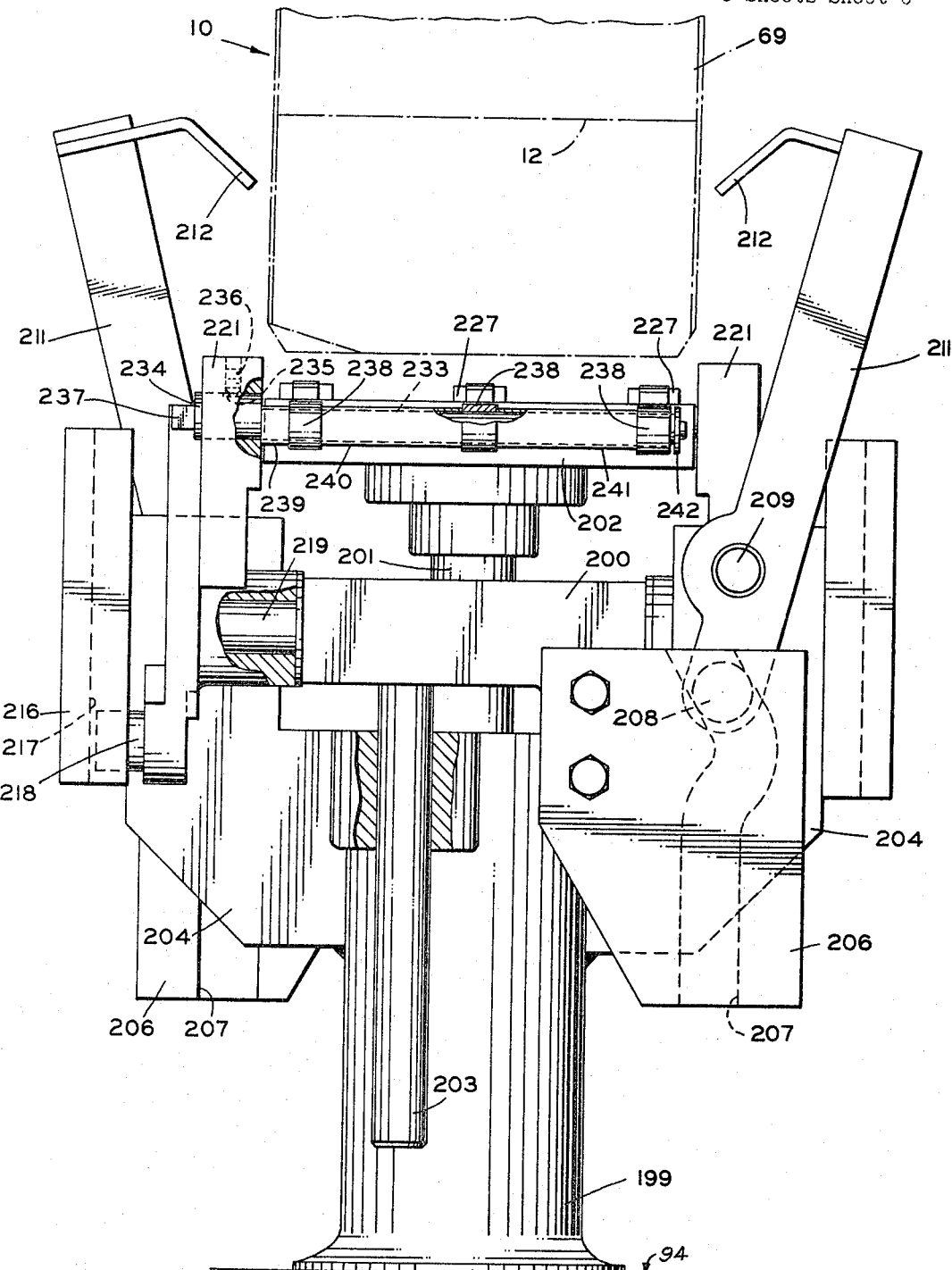
FIG. 7 is an end elevational view of the bottom folding, tucking and bonding unit employed in the machine illustrated in FIG. 1, and showing the adjustable roller jam tucker used for moving the tuck-out bottom closure panel into closing position.

7, a reciprocating cam plate 206 is secured to the support plate 200 and reciprocates with it. The cam plate 206 is provided with a cam track 207. As shown in FIG. 7, a cam follower 208 is attached to one end of the breaker arm 211 and moves along the cam track 207. The breaker arm 211 is pivotally connected to the stationary pivot 209. The breaker shoe 212 is connected to the opposite end of the breaker arm 211. There are two sets of breaker arms and breaker shoes. The breaker shoes 212 will act on the bottom closure panels 45 and 46 in a manner to be described hereinafter.

Tucker arm 221 is connected to the support plate 200 by the reciprocating pivot 219. Attached to one end of the tucker arm 221 is a tucker rod such as tucker rod 222 and tucker rod 233. At the opposite end of tucker arm 221 is attached the cam follower 218. The cam follower 218 is operated by cam track 217 which is part of the stationary cam plate 216. Stationary cam plate 216 is attached to support block 204 which is stationary and secured to the pressure support member 199. The tucker rod 222 acts on closure panel 43 and will move a little faster than the tucker rod 233 acting on bottom closure panel 44, so that the tuck-in flap 47 on panel 43 will be between the tuck-out flap 48 and the container body.

As shown in FIG. 7, the breaker arm 211 on the left will be nearer to the mandrel support housing 93. The right breaker arm 211, in FIG. 7, will be radially displaced from the first breaker arm with respect to housing 93. The tucker rods 222 and 233 will be substantially an equal distance from the mandrel support housing 93. The bottom closure panel 44 will be the leading panel of the container 10 as it rotates with the bottom closing mandrel assembly 95.

Figure 12:
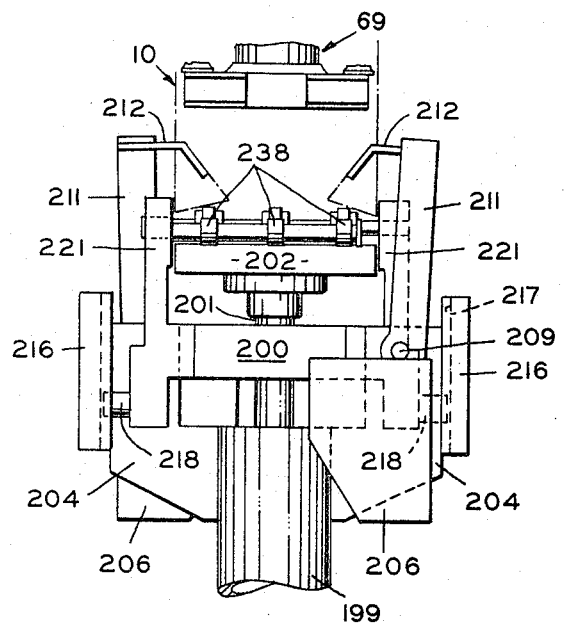

Referring to FIGS. 8 through 15, a method of closing a container bottom will be explained. A complete description of the bottom and its features are disclosed in U.S. Patent 3,120,333. FIGS. 10 and 12 show the bottom folding, tucking and bonding means in its initial position when the mandrel 69 is indexed over the pressure pad 202. The tucker rods 222 and 233 are disposed below the end of the container permitting the mandrel with the mounted container blank to be passed over it. Breaker arms 211 and 212 are positioned away from the container line of travel so that the mandrels with the mounted containers can be indexed between them. After a mandrel is in position, the shaft 201 is activated upwardly by means (not shown) such as a suitable air cylinder or the like. As the shaft 201 moves upward, it starts moving the pressure pad 202 toward the bottom closure panels.

Figure 13:
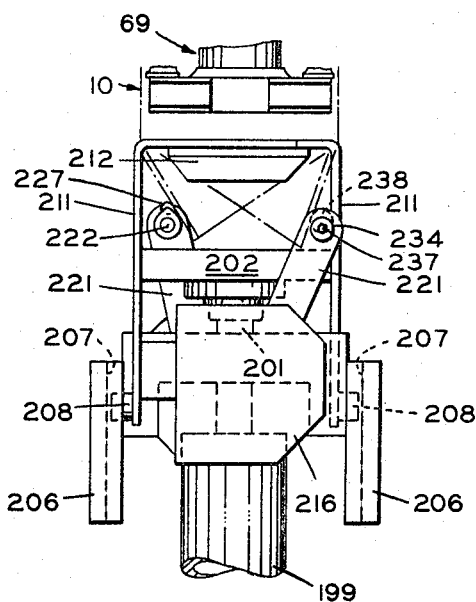
Figure 14:
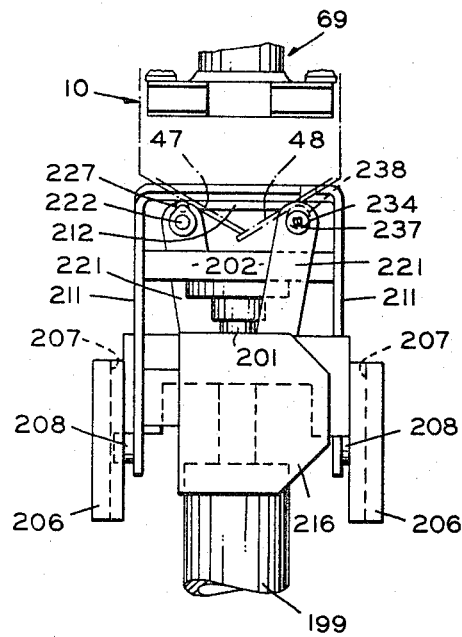
Figure 15:
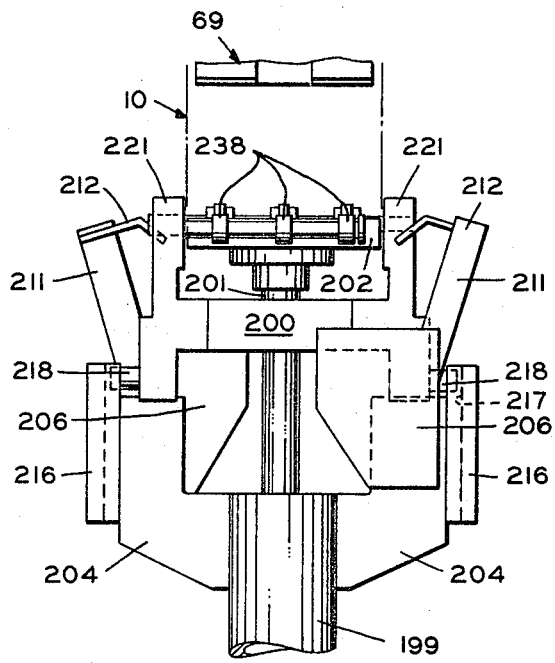

Disposed below the pressure pad 202 is a support plate 200 which is secured to the shaft 201 and reciprocates with it. Attached to the support plate is the reciprocating cam plate 206 which reciprocates with the support plate 200. The cam track 207 acts on the cam follower 208 as it reciprocates upwardly and downwardly. This action causes the breaker arm 211 to rotate in and out from the pressure pad path. As the pressure pad starts upward, the breaker shoes 212 will start contacting the triangular bottom closure panels 45 and 46. This will cause breaking of score lines 20, 21, 22 and 23 below the score line 12, and the breaking of score line 12 along with the breaking of score lines 50 and 51, 54 and 55. As the breaker shoes 212 continue moving in and toward each other, they move the panels 45 and 46 toward each other. At the same time, the support plate 200 is moving the tucker arms 221 and tucker rods 222 and 233 upward by moving the reciprocating pivots 219 upward. As the shaft 201 continues upward the cam follower 218 is acted upon by the cam track 217 which is part of the stationary arm plate 216, which is secured to the support block 204. The cam track 217 will cause the tucker arms to rotate about reciprocating pivot 219 toward each other, so that they will start acting on the panels 43 and 44. Referring to FIGS. 12 and 13, the breaker shoes 212 are shown acting on bottom closure panels 45 and 46, and the tucker rods 222 and 233 acting on panels 43 and 44, respectively. As shaft 201, with the associated parts, continues to move upward, the cam track 207 causes the breaker arms 211 to move away from each other and out from the mandrel 69. The tucker rods continue toward each other with the tucker rod 222 acting on bottom closure panel 47 and moving a little faster than the tucker rod 33 which is acting on bottom closure panel 44, so that the tuck-in flap 47 starts acting on the inside of tuck-out flap 48, as viewed in FIG. 14, causing the bottom to be tucked. As the shaft 201 continues upward, the pressure pad 202 starts acting on the tuck-out flap 48, thus preventing the bottom closure panels from opening up and becoming untucked. The pressure pads will continue upward, and the tucker rods 222 and 233 will be cleared from the pressure path as well as the breaker shoes 212. The pressure pad 202 will continue upward, putting pressure on the bottom closure panels, causing them to be bonded together to form a liquid tight bottom.

The pressure pad 227 is provided with suitable embossing marks, which are not shown in the drawing, and they are adapted to emboss the formed bottom closure 56, as shown in FIG. 19. The pressure pad 202 and the mandrel 69 may be water cooled, if required. This prevents the heated thermoplastic surfaces from sticking to them.

The panel 15 will be the leading panel and will leave the pressure pad first, which will cause the bottom closure panel 44 to slide along the pressure pad 202 in the lead position, thus preventing the tuck-over flap 48 from catching on any obstruction on the pressure pad. The pressure pad is then indexed to the dwell position 81. At this dwell station a second pressure pad may be incorporated, if desired. The mandrel is then indexed from the dwell position 81 to the mandrel ejection position 82.

Figure 8:
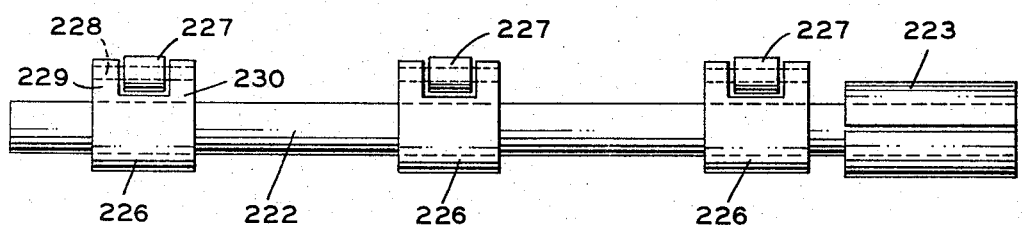
FIG. 8 is a side elevational view of the roller jam tucker used for moving the tuck-in bottom closure panel into closing position.

Referring now to FIG. 8, the novel tucker rod 222 will be explained. The tucker rod 222 is mounted in the sleeve 223 which is operatively secured in the bore 224 in the tucker arm 221, as shown in FIG. 9. The tucker rod 222 may be secured in a desired adjusted position in the sleeve 223 by means of the set screw 225. As best seen in FIGURES 8 and 9, the tucker rod 222 is provided with a plurality of spaced apart roller carrier members 226 which are secured to the shaft 222 by any suitable means. Each of the carrier members 226 is provided with a pair of spaced apart arms 229 and 230 between which is rollably supported a roller 227 by means of the shaft 228.

As best seen in FIGS. 7 and 9, the other tucker rod 233 is provided on one end thereof with an eccentric enlargement 234 which is rotatably mounted in the hole 235 in the other tucker arm 221. The eccentric 234 is adapted to be secured in an adjusted position in the hole or bore 235 by any suitable means, as by the set screw 236. As shown in FIGS. 7 and 9, the eccentric 234 is provided with a square shaft or extension 237 for engagement by a suitable wrench for turning the eccentric in the bore 235. The tucker arm 233 further includes a plurality of rollers 238 which are spaced apart by means of the sleeves 239, 240 and 241. A suitable retainer ring 242 is adapted to secure the rollers and spacing sleeves on the tucker rod 233.

It will be seen that when the tucker arms 221 operate in the aforedescribed manner, the rollers 227 on the tucker rod 222 will coact with the rollers 238 on the tucker rod 233 to provide an efficient bottom closing action. The eccentric mounting of the tucker rod 233 will provide for an adjustment action which permits the machine to be changed from one size container to another, and yet provide a tight bottom closing action on the bottom panels. Experience has shown that a roll jam tucker structure as last described provides an efficient container bottom closing action.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a container fabricating machine, an apparatus for folding, tucking and bonding the heated bottom of a thermoplastic container having first and second pairs of opposed closure panels, and wherein one of the second pair of closure panels is provided with a tuck-in flap and the other of the second pair of closure panels is provided with a tuck-out flap; the machine comprising:
   (a) a machine base;
   (b) a rotary turret mounted on said base and having a plurality of body forming mandrels mounted in spaced apart depending relation thereon;
   (c) a presssure pad support member having a shaft reciprocally mounted therein positioned on said base;
   (d) a pressure pad secured to the upper end of said shaft;
   (e) a pair of breaker shoes pivotally mounted on said support member to act on the first pair of opposed closure panels;
   (f) a pair of tucker arms each connected to said support member by reciprocating pivot means;
   (g) a first tucker rod mounted on one arm of said pair of arms and a second tucker rod mounted on the remaining arm of said pair of arms;
   (h) a plurality of spaced apart roller carrier members rotatably adjustable on said first tucker rod;
   (i) each said carrier member having means for rollably supporting a tucker roller operable on the tuck-in flap wherein said rollers are individually rotatably adjustable about the longitudinal axis of said first tucker rod to selectively bow the tuck-in flap panel;
   (j) a plurality of spaced apart tucker rollers mounted on said second tucker rod operable on the tuck-out flap; and
   (k) said second tucker rod having one end eccentrically mounted in its associated tucker arm relative to the longitudinal axis of the rod for uniform rotatable adjustment of said tuck-out flap rollers about the longitudinal axis of the eccentric mounting.

2. In a container fabricating machine according to claim 1, having:
   (a) a plurality of sleeve members provided on said second tucker rod to space said mounted tucker rollers.

3. In a container fabricating machine, an apparatus for folding, tucking and bonding the heated bottom of a thermoplastic container having first and second pairs of opposed closure panels, and wherein one of the second pair of closure panels is provided with a tuck-in flap and the other of the second pair of closure panels is provided with a tuck-out flap; the machine comprising:
   (a) a machine base;
   (b) a rotary turret mounted on said base and having a plurality of body forming mandrels mounted in spaced apart depending relation thereon;
   (c) a pressure pad support member having a shaft reciprocally mounted therein positioned on said base;
   (d) a pressure pad secured to the upper end of said shaft;
   (e) a pair of breaker shoes pivotally mounted on said support member to act on the first pair of opposed closure panels;
   (f) a pair of tucker arms each connected to said support member by reciprocating pivot means;
   (g) a first tucker rod mounted on one arm of said pair of arms and a second tucker rod mounted on the remaining arm of said pair of arms;
   (h) a plurality of spaced apart rollers mounted on said first tucker rod; and
   (i) said first tucker rod having one end eccentrically mounted in its associated tucker arm relative to the longitudinal axis of the rod for uniform rotatable adjustment of said rollers about the longitudinal axis of the eccentric mounting.

4. In a container fabricating machine, an apparatus for folding, tucking and bonding the heated bottom of a thermoplastic container having first and second pairs of opposed closure panels, and wherein one of the second pair of closure panels is provided with a tuck-in flap and the other of the second pair of closure panels is provided with a tuck-out flap; the machine comprising:
   (a) a machine base;
   (b) a rotary turret mounted on said base and having a plurality of body forming mandrels mounted in spaced apart depending relation thereon;
   (c) a pressure pad support member having a shaft reciprocally mounted therein positioned on said base;
   (d) a pressure pad secured to the upper end of said shaft;
   (e) a pair of breaker shoes pivotally mounted on said support member to act on the first pair of opposed closure panels;
   (f) a pair of tucker arms each connected to said support member by reciprocating pivot means;
   (g) a first tucker rod mounted on one arm of said pair of arms and a second tucker rod mounted on the remaining arm of said pair of arms;
   (h) a plurality of spaced apart tucker rollers mounted on said tucker rods operable on the tuck-out and tuck-in flaps; and
   (i) one of said tucker rods having one end eccentrically mounted in its associated tucker arm relative to the longitudinal axis of the rod for uniform rotatable adjustment of said rollers about the longitudinal axis of the eccenrtic mounting.

5. In a container fabricating machine, an apparatus for folding, tucking and bonding the heated bottom of a thermoplastic container having first and second pairs of opposed closure panels, and wherein one of the second pair of closure panels is provided with a tuck-in flap and the other of the second pair of closure panels is provided with a tuck-out flap; the machine comprising:
   (a) a machine base;
   (b) a rotary turret mounted on said base and having a plurality of body forming mandrels mounted in spaced apart depending relation thereon;
   (c) a pressure pad support member having a shaft reciprocally mounted therein positioned on said base;
   (d) a pressure pad secured to the upper end of said shaft;
   (e) a pair of breaker shoes pivotally mounted on said support member to act on the first pair of opposed closure panels;
   (f) a pair of tucker arms each connected to said support member by reciprocating pivot means;
   (g) a first tucker rod mounted on one arm of said pair of arms and a second tucker rod mounted on the remaining arm of said pair of arms;
   (h) a plurality of spaced apart roller carrier members rotatably adjustable on said first tucker rod;
   (i) each said carrier member having means for rollably supporting a tucker roller operable on the rotatably adjustable about the longitudinal axis of said first tucker rod to selectively bow the tuck-in flap panel; and
   (j) a plurality of spaced apart tucker rollers mounted on said second tucker rod operable on the tuck-out flap.

6. In a container fabricating machine according to claim 5, having,
(a) a plurality of sleeve members provided on said second tucker rod to space said mounted tucker rollers.

References Cited

UNITED STATES PATENTS

| | | | |
|---|---|---|---|
| 767,445 | 8/1904 | Scales | 93—44.1 |
| 3,212,413 | 10/1965 | Allen et al. | 93—44.1 |

WILLIAM W. DYER, JR., *Primary Examiner.*

R. ALVEY, *Assistant Examiner.*